No. 669,120. Patented Mar. 5, 1901.
J. M. LAFFAS.
BEARING.
(Application filed Nov. 22, 1900.)
(No Model.)

Witnesses
Inventor
Jean Marie Laffas
by Philip Mauro
his Atty.

THE NORRIS PETERS CO., PHOTO-LITHO., WASHINGTON, D. C.

UNITED STATES PATENT OFFICE.

JEAN MARIE LAFFAS, OF LE VÉSINET, FRANCE.

BEARING.

SPECIFICATION forming part of Letters Patent No. 669,120, dated March 5, 1901.

Application filed November 22, 1900. Serial No. 37,395. (No model.)

*To all whom it may concern:*

Be it known that I, JEAN MARIE LAFFAS, civil engineer, a resident of Le Vésinet, France, have invented new and useful Improvements in and Connected with Bearings, which improvements are fully set forth in the following specification.

This invention relates to roller-bearings in which the peripheral sliding friction is entirely eliminated and rolling friction is substituted therefor.

Roller-bearings according to this invention are shown by way of example in the accompanying drawings, in which—

Figure 1:
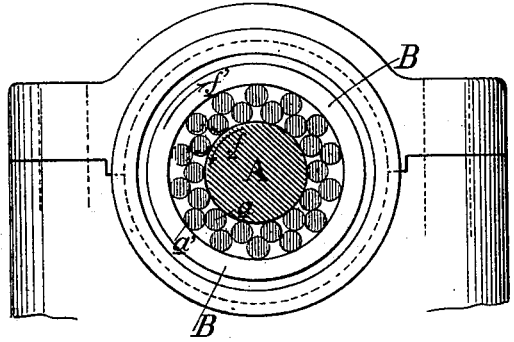
Figure 3:
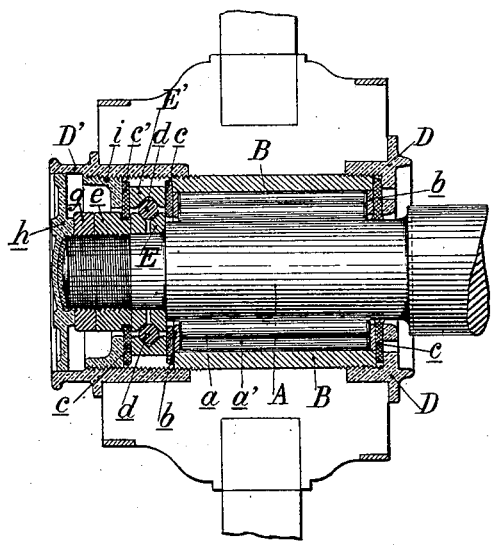
Figure 2:
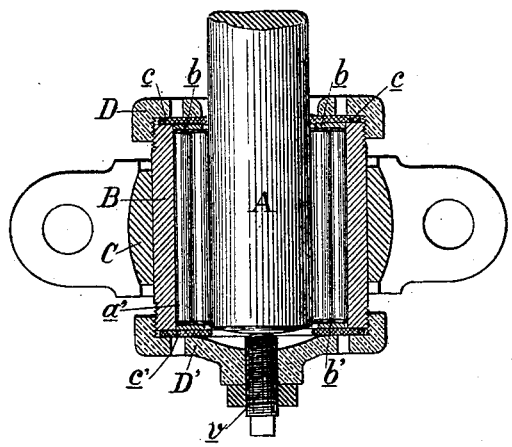
Figure 4:
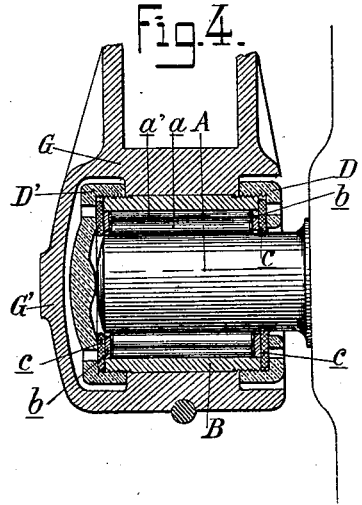

Figures 1 and 2 are respectively an end view and a horizontal section of a roller-bearing for a transmission-shaft the end of which bears against an abutment-screw. Fig. 3 is a longitudinal section of an axle-box for a road-vehicle. Fig. 4 is a longitudinal section through the axis of an axle-box for a railway-vehicle.

From Fig. 1 it will be seen that when a journal A rotates in the direction indicated by the arrow $f$ a series of rollers $a$ $a'$ will rotate in the opposite direction, (indicated by the arrow $f'$.) The rollers $a$ and $a'$ may be regarded as constituting groups, each consisting of three rollers whose axes pass through the angular points of a triangle at right angles to the said axes. When the rollers $a$ have completed a sufficient number of revolutions to make their peripheral paths equal to the circumference of the journal A, the rollers $a'$ will have traversed a similar distance, which corresponds only to a portion of a bush or path B, secured in a plumber-block C. At the ends of the rollers there are arranged steel washers $b$ $b$, behind which are placed felt washers $c$ $c'$, held in place by a nut D and by an end nut D, that carries an abutment-screw $v$.

In Fig. 3 the nuts D D' are shown scarcely modified, especially the nut D; but the endwise abutment is supported by a row of balls $d$ $d$, which run in a race arranged between a fixed part E, adjusted by nuts $e$ $g$ $h$, and a loose part E', that forms part of the internal movable periphery of the wheel and is adjusted by the nut D' and the externally-screwed ring $i$, felt washers $c$ $c'$ being interposed to prevent the entrance of dust.

In Fig. 4 the arrangements at the end are shown somewhat modified, especially at the external end, for the sake of simplicity. The rollers $a$ $a$ $a'$ $a'$ are arranged and held and operate in the manner hereinbefore described between the journal A and the bush B and between the washers $b$ $b$, the felt washers $c$ $c$, and the nuts D and D'. The body of the box G and its lower cover G' contain the internal-roller arrangement, and the nut D', which, as well as the nut D, is provided with holes for screwing it up, serves as an abutment.

Having now particularly described and ascertained my invention, I declare that what I claim is—

1. In a roller-bearing, the combination with a shaft or axle and a support or part having a circular bearing-opening formed therein, of two concentric groups of rollers interposed between the shaft or axle and the inner wall of the circular opening, removable caps for closing the ends of the circular opening respectively, metallic washers at opposite ends of the rollers, and yielding washers interposed between the metallic washers and the caps, both the metallic and yielding washers being removably held in place by the caps.

2. In a roller-bearing, the combination with a shaft or axle and a support or part having a circular bearing-opening formed therein, of two concentric groups of rollers interposed between the shaft or axle and the inner wall of the circular opening, caps for closing the ends of the circular opening respectively, metallic washers at opposite ends of the rollers, yielding washers interposed between the metallic washers and the caps, and ball-bearings about the shaft or axle for receiving the end thrust thereof.

In testimony whereof I have signed this specification in the presence of two subscribing witnesses.

JEAN MARIE LAFFAS.

Witnesses:
ANTONIE FERNAND DE LA CALLE,
EDWARD P. MACLEAN.